United States Patent [19]
Petzold et al.

[11] Patent Number: 4,811,225
[45] Date of Patent: Mar. 7, 1989

[54] RATIO CONTROL TECHNIQUE FOR CONTINUOUSLY VARIABLE TRANSMISSION

[75] Inventors: Werner P. Petzold, Harwood Heights, Ill.; William P. Umlauf, Schererville, Ind.

[73] Assignee: Borg-Warner Automotive, Inc., Troy, Mich.

[21] Appl. No.: 25,389

[22] Filed: Mar. 13, 1987

[51] Int. Cl.⁴ ................... F16H 11/06; F16H 55/56
[52] U.S. Cl. .................... 364/424.1; 74/866; 74/867
[58] Field of Search ............. 364/424.1; 74/866, 867; 192/0.075, 0.092; 474/12, 18, 28

[56] References Cited

U.S. PATENT DOCUMENTS

| | | | |
|---|---|---|---|
| 4,231,092 | 10/1980 | Grob et al. | 364/424.1 |
| 4,458,318 | 7/1984 | Snut et al. | 74/866 |
| 4,522,086 | 6/1985 | Haley | 74/866 |
| 4,539,866 | 9/1985 | Koivunen | 74/695 |
| 4,689,745 | 8/1987 | Itoh et al. | 364/424.1 |
| 4,706,789 | 11/1987 | McColl et al. | 192/0.075 |
| 4,724,724 | 2/1988 | Tezuka | 364/424.1 |

*Primary Examiner*—Parshotam S. Lall
*Assistant Examiner*—V. N. Trans
*Attorney, Agent, or Firm*—James J. Jennings; Robert L. Zieg; Richard A. Cederoth

[57] ABSTRACT

A ratio control system for use in a continuously variable transmission is disclosed in conjunction with an improved technique for operation thereof. Individual gain schedules provide proportional gain in response to a selected one of a number of modes dependent upon clutch input speed, transmission belt ratio, or engine set point. Engine speed set point is determined as a function of a set point schedule in conjunction with a limiter and a filter to provide a gradual response to rapid changes in a throttle input or driver demand signal and vehicle speed. The error signal generated as an output of any of the proportional gain loops is integrated and combined with a null signal to provide a signal to generate a duty cycle for a pulse width modulation controlled electro-hydraulic control valve to control the pressure to the primary sheave in a continuously variable transmission system for modifying the belt ratio. An integration function may be used or bypassed at appropriate times to account for physical limitations in the possible range for the belt ratio. Full low and full overdrive conditions are provided through an open loop gain corresponding to maximum and minimum duty cycle signals.

7 Claims, 7 Drawing Sheets

RATIO CONTROL TECHNIQUE FOR CONTINUOUSLY VARIABLE TRANSMISSION

BACKGROUND OF THE INVENTION

The present invention generally relates to the continuously variable transmission art. More particularly, the present invention relates to belt ratio control for continuously variable transmissions and to providing desired belt ratio control in particular driving circumstances.

The art contains numerous examples of the operation and construction of continuously variable transmissions (CVT's), e.g., U.S. Pat. No. 4,522,086 and U.S. Pat. No. 4,458,318, entitled Control System for Continuously Variable Transmission, and Control Arrangement for a Variable Pulley Transmission, respectively. These patents, generally describe the mechanics and controls for a CVT system utilizing two adjustable pulleys, each pulley having at least one sheave which is axially fixed and another sheave which is axially movable relative to the first sheave. A flexible belt of metal or elastomeric material intercouples the pulleys. The interior faces of the pulley sheaves are beveled or chamfered. Thus, as the axially displaceable sheave moves relative to the fixed sheave, the distance between the sheaves and, thus, the effective pulley diameter may be adjusted. The displaceable sheave includes a fluid constraining chamber for receiving fluid to move the sheave and thus change the effective pulley diameter; as fluid is exhausted from the chamber, the pulley diameter changes in the opposite sense. Generally, the effective diameter of one pulley is adjusted in one direction as the effective diameter of the second pulley is varied in the opposite direction, hereby effecting a change in the drive ratio between the input shaft coupled to an input pulley and an output shaft coupled to an output pulley. The ratio changes continuously as the pulley diameters vary. Such transmissions frequently are referred to in the art as a continuously variable transmission, CVT.

Through the years various developments have refined and improved the hydraulic control system which is used to pass fluid into the fluid holding chamber of each adjustable pulley. An example of such a hydraulic system is shown in U.S. Pat. No. 3,115,049 - Moan. In that patent, control of the secondary pulley adjustable sheave regulates the belt tension, while a different circuit regulates fluid into and out of the primary sheave to regulate the transmission ratio. U.S. Pat. No. 4,152,947 -van Deursen et al.-also describes control of a CVT. In both systems, the line pressure of the fluid applied to hold the belt tension by pressurizing the secondary chamber is kept at a relatively high value. An improved control system subsequently was developed to reduce the mainline fluid pressures supplied to the secondary sheath chamber as a function of torque demand. This improved system is described and claimed in an application entitled "Control System for Continuously Variable Transmission," now U.S. Pat. No. 4,522,086, assigned to the assignee of this application. Further work resulted in an improved control system which reduced the line pressure applied to the secondary chamber to a lower, safer operating pressure and also provided a lower control pressure for other portions of a hydraulic control system. This system is described in an application entitled "Hydraulic Control System for a Continuously Variable Transmission", Ser. No. 421,198, filed Sept. 22, 1982 which issued Dec. 15, 1987, as U.S. Pat. No. 4,712,453 and assigned to the assignee of this application.

Additional significant advances in CVT control systems have been described and claimed in another application also entitled "Hydraulic Control System for a Continuously Variable Transmission," Ser. No. 717,913, filed Mar. 29, 1985 which issued Jan. 12, 1988 as U.S. Pat. No. 4,718,308, and assigned to the assignee of this application.

Another application Ser. No. 722,578, filed Apr. 12, 1985, entitled "Clutch Control System for a Continuously Variable Transmission", which issued Mar. 10, 1987 as U.S. Pat. No. 4,648,496, further describes control logic techniques for regulating pressure at a clutch in a CVT system to provide the desired torque transfer from an engine to a vehicle drive line. In that system, clutch control depends on logical recognition of one of a number of operating modes.

A related, co-pending application entitled Continuously Variable Transmission Clutch Control System Ser. No. 25,391 filed Mar. 13, 1987, which issued Dec. 27, 1988 as U.S. Pat. No. 4,793,454, assigned to the assignee of the present application, discloses an improved clutch controller for use in CVT applications. A second, related, co-pending application entitled "Special Start Technique For Continuously Variable Transmission Clutch Control", Ser. No. 25,476 filed Mar. 13, 1987, assigned to the assignee of the present application, discloses a unique technique for regulating the clutch pressure control signal in a CVT system during selected driving conditions, e.g. skidding on ice.

The teachings of each of the above referenced patents and applications are incorporated herein by reference in terms of background to the present invention, although none of the previously envisioned systems addresses implementation of the control techniques disclosed herein.

BRIEF SUMMARY OF THE INVENTION

Accordingly, a principal object of the present invention lies in providing an improved ratio control technique which generally overcomes the deficiencies of the prior art.

A more specific object of the present invention lies in the provision of belt ratio control techniques for continuously variable transmission driven vehicles during a variety of driving conditions.

Additional and further objects and advantages of the present invention will become apparent from the following detailed description and accompanying drawings.

BRIEF DESCRIPTION OF THE DRAWINGS

The novel features of the present invention are set forth with particularity in the appended claims. The invention, together with the objects and advantages thereof, may be understood more fully by reference to the following detailed description taken in conjunction with the accompanying drawings in which like reference numerals are used to indicate like elements and of which:

DETAILED DESCRIPTION OF A PREFERRED EMBODIMENT

Figure 1:
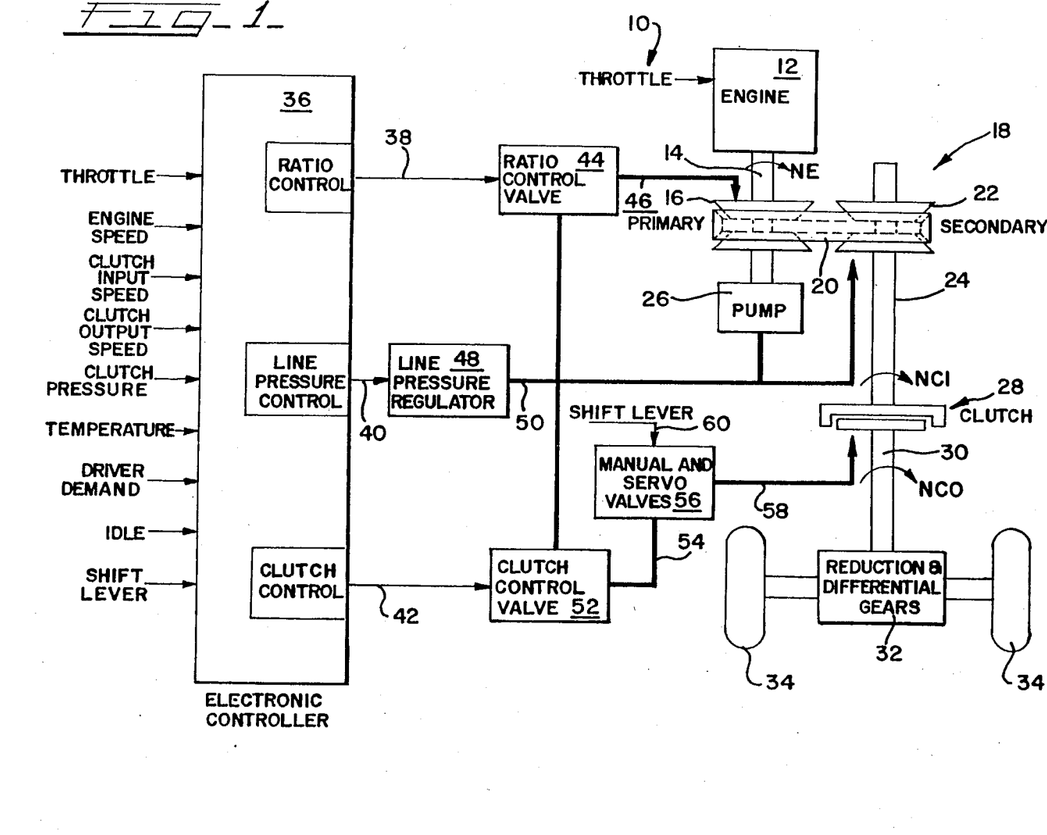
FIG. 1 is a block diagram representation of a continuously variable transmission drive system.

As shown in FIG. 1, a throttle signal 10 controls the operation of an engine 12 which transmits torque via shaft 14 to a primary pulley 16 in a CVT 18. In a typical embodiment, a flywheel and damping arrangement may be included on shaft 14 between the engine 12 and the primary pulley 16. A metal or elastomeric belt 20 connects the primary pulley 16 to a secondary pulley 22 to transmit torque to a second shaft 24. A pump 26 may also be driven by the first shaft 14 to provide line pressure for the hydraulic system and the controls of the CVT 18.

The second shaft 24 drives the input to a clutch 28 which in turn provides a torque to a third shaft 30. The third shaft 30 drives a reduction differential gear arrangement 32 as a drive line to provide power to the vehicle wheels 34.

In operation, an electronic controller 36 receives throttle, engine speed, clutch input speed, clutch output speed, clutch pressure, temperature, driver demand, idle, shift lever and other information input signals as shown at the left of FIG. 1. The electronic controller 36 operates in a logical fashion to provide a ratio control signal on a line 38, a line pressure control signal on a line 40 and a clutch control signal on a line 42. The signal on the line 38 to a ratio control valve 44 controls the hydraulic pressure on a line 46 to the primary pulley 16 of the CVT 18 to control the ratio between the primary pulley 16 and the secondary pulley 22, i.e., the belt ratio. The signal on the line 40 communicates with a line pressure regulator 48 which via a line 50 provides line pressure from flow delivered by pump 26 to the ratio control valve 44, and to clutch control valve 52. The output of the line pressure regulator on the line 50 also controls the pressure at the secondary pulley 22 to ensure that the belt 20 does not slip. The output signal on the line 42 to the clutch control valve 52 controls the output of the clutch control valve 52 on a line 54 to the manual and servo valves 56 which controls the fluid flow on the line 58 to the clutch 28. This is the signal which controls or which provides the pressure at the clutch 28 and hence regulates the torque transfer from the second shaft 24 to the third shaft 30.

A shift lever signal on a line 60 provides an additional control of the manual and servo valves 56. When the shift lever signal on the line 60 indicates that the vehicle is in a neutral or park mode, the manual control within the valve arrangement 56 is closed. This prevents fluid from flowing to the clutch 28 and thus prevents any torque transfer through the clutch 28 when the vehicle is in the neutral mode.

A first arrow NE (N=speed; E=engine) on the first shaft 14 indicates one acceptable point of measurement for engine speed. A second arrow NCI (CI=clutch input) on the second shaft 24 indicates an acceptable point of measurement for the clutch input speed. A third arrow NCO (CO=clutch output) indicates an acceptable point of measurement for the clutch output speed, which corresponds to vehicle speed. Those skilled in the art will recognize that the various speed values may be accurately obtained at other locations as desired. It should be appreciated that the ratio of NE to NCI will correspond to and provide a measure of the transmission belt ratio. The difference between NCI and NCO correspondingly provides a measure of the slippage at the clutch 28. When NCI equals NCO, the clutch 28 should be locked-up with no slippage.

It will be appreciated by those skilled in the art that the electronic controller 36 implements the control functions for controlling the hydraulic fluid flow to the primary sheave actuator 16 by means of a pulse width modulation (PWM)-operated electrohydraulic control valve 44. The resultant pressure from this flow moves the primary actuator which forces the belt to move in the primary and secondary pulleys. Movement of the belt creates a ratio change in the CVT.

As in the related applications directed primarily to clutch control, the present invention envisions a number of control modes for operation of ratio control by means of the electronic controller 36 and the ratio control valve 44. In the system of the present invention, there are four control modes, namely, ENGINE SPEED CONTROL: The system performs closed loop control of the actual engine speed to an engine speed set point which is determined from a schedule based on throttle position and vehicle speed. Alternately, the system may use a closed loop control of the actual engine speed to a set point which is obtained from an external strategy.

BELT RATIO CONTROL: The system performs closed loop control of the actual belt ratio as determined by the engine speed (CVT input speed) divided by the clutch input speed. As explained above this is also given by the ratio of NE to NCI. The set point can be input to the control system, based on external criteria, or once this control mode is entered, the system may use the current ratio as the set point. This would cause the CVT to maintain this ratio once this mode is entered.

CLUTCH INPUT SPEED CONTROL: The system performs closed loop control of the actual clutch input speed. The set point can be input to this control system, based on external criteria, or once this control mode is entered, the system may use the clutch output speed as the set point. This would cause the CVT to synchronize the clutch input and the clutch output speed to facilitate clutch re-engagement. This control mode can only be used when the clutch is in a non-torque carrying mode.

OPEN LOOP CONTROL: By sending out a full-on duty cycle or a full-off duty cycle, the open loop mode will place the CVT in full low ratio or maximum overdrive at the maximum rate at which the sheaves can move. Full low and maximum overdrive ratios are determined by the physical limits of the sheaves in the primary and secondary pulleys.

Figure 2:
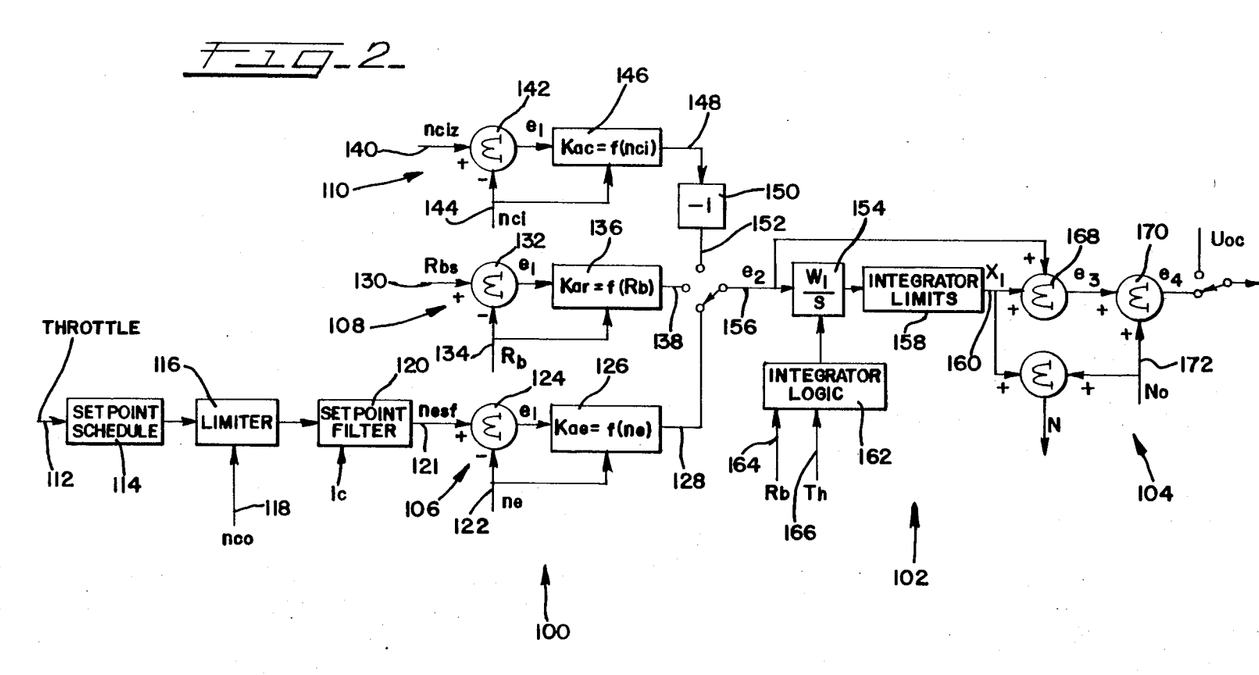
FIG. 2 is a block diagram representation of a preferred embodiment for ratio control in a continuously variable transmission system according to the present invention.

Referring now to FIG. 2, therein is shown a block diagram representation of a system for providing a ratio control technique in accordance with the present invention. The controller of FIG. 2 generally comprises a proportional control section 100, an integrator-lead calculation section 102 and a nominal null control section 104. The proportional control section, in turn, generally comprises an engine speed control loop 106, a belt ratio control loop 108 and a clutch input speed control loop 110. Only one of these loops functions at any time dependant on the parameter being controlled. In each of these three loops, a particular gain schedule is utilized to provide the loop control parameters. These schedules are illustrated in an exemplary fashion in FIGS. 4, 5 and 6. Also, the engine speed control loop 106 utilizes a set point schedule and a limiter schedule illustrated generally in an exemplary fashion in FIGS. 7 and 8, respectively.

Overall, the proportional gain portion 100 attempts to maintain a constant open loop gain to yield a constant closed loop system response for all parameter conditions. The particular gain schedules for each of the proportional control loops 106, 108 and 110 facilitate this operation. Once a gain is determined from the schedules, it is multiplied by the nominal loop gain. This provides the loop gain by which the error signal is multiplied to provide an output error signal to the integrator-lead portion of the controller 102.

As shown in FIG. 2, the engine speed control loop 106 receives a filtered engine speed set point, $n_{esf}$, at a line 121. The actual engine speed, $n_e$, from a line 122 is then subtracted from the engine speed set point on line 121 at a summing junction 124. This provides a first error signal $e_1$ to a variable gain function block 126 which provides a multiplication factor to the nominal control loop gain as a function of the engine speed received on the line 122 (also received at the gain control box 126). This provides a first output signal $e_2$ on a line 128 for provision to the integrator lead section 102 when the engine speed control loop has been selected.

The belt ratio control loop 108 illustrated in FIG. 2 receives a belt ratio set point, $R_{bs}$ at a line 130. A summing junction 132 then subtracts the actual belt ratio signal, $R_b$, received on a line 134 to generate a first error signal, $e_1$. A gain function block 136 which also provides a multiplication factor to the nominal control loop gain, then generates a belt ratio gain, Kar, as a function of the actual belt ratio received at line 134. The belt ratio control loop 108 then multiplies the signal $e_1$ from summing junction 132 to provide an $e_2$ error signal on a line 138 to the integrator lead section 102 when the belt ratio control loop has been selected.

The clutch input speed controller 110 receives a clutch input speed set point at a line 140. A summing junction 142 then subtracts the actual clutch input speed received at a line 144 to generate a first error signal $e_1$. The error signal $e_1$ from the summing junction 142 is then multiplied by a gain factor determined as a product of the nominal gain times the gain determined from a schedule at a block 146 as a function of the actual clutch input speed received from line 144. The product of $e_1$ and the proportional gain from the function block 146 $K_{ac}$, on a line 148 is then provided with a negative one gain to achieve the proper error signal polarity, at a function block 150 to provide a signal at a line 152 to the integrator lead section 102 when the clutch input speed control loop 110 has been selected.

The integrator-lead control section 102 operates to force any steady-state error in the controller system to be zero. The integrator gain desirably comprises a relatively small value so as to yield a slow response which does not affect the system dynamics. This avoids the possibility of generating an undesired instability in the control system. However, through the use of the integrator, the controller may adjust the null of the system. This allows it to track slowly varying changes in the system and maintain the steady-state error at zero.

The integrator lead section 102 illustrated in FIG. 2 comprises an integrator function block 154 which receives an error signal $e_2$ from a line 156 which may be connected to one of lines 128, 138 and 152 depending upon which of the three proportional gain control loops has been selected for control of the system. Generally, the integrator function block 154 performs an integration as shown by the transfer function therein to provide a signal to an integrator limit function 158 to provide an output signal $x_1$ at a line 160.

The integrator limit function embodied in the block 158 of FIG. 2 prevents the digital implementation of the integrator 154 from saturating the input to the pulse width modulation generator at the output of the control system. Accordingly, the output of the integrator must be compared with upper and lower limits to keep it within an acceptable range for the pulse width generator.

However, the integrator 154 is not always allowed to operate, again dependent upon physical conditions present in the system. An integrator logic block 162 controls the operation of the integrator 154. The integrator logic block 162 receives a belt ratio signal at a line 164 and a throttle signal at a line 166.

Certain operating conditions may be utilized to determine whether the integrator should be allowed to function or hold its current value. In the present embodiment, these conditions are reflected in the belt ratio received at the line 164 and the throttle position received at the line 166. If the belt ratio is less than a predetermined value close to the actual overdrive ratio or greater than a predetermined value close to the actual full low ratio, the integrator does not function, but is held at its current value. This prevents the integrator from calculating an incorrect steady-state error correction signal when the pulley sheaves achieve their physical displacement limits.

Also, the integrator logic monitors the throttle position. If the throttle position is less than a predetermined value, the integrator is not allowed to function but is held at its present state. This allows the control system to distinguish between power-off and power-on conditions.

The integrator 154 typically will be provided with an initial condition. In the preferred embodiment, this initial condition (not illustrated) is chosen as zero.

Referring now to the nominal null section 104 of the system in FIG. 2, the system therein receives a nominal null input signal, $N_0$, the error signal from the proportional gain loop section 100, $e_2$, and the output of the integrator control 102, $X_1$. This portion of the system then provides an output signal $e_4$.

In the nominal null section 104, a summing junction 168 combines the output of the integrator, $X_1$, with the error signal, $e_2$, from the proportional gain loop section 100. A second summing junction 170 then combines the output, $e_3$, of the first summing junction 168, with a nominal null input $N_0$, from a line 172 to form the output signal, $e_4$.

The output signal, $e_4$, then controls the duty cycle of the signal to drive the PWM controlled electrohydraulic valve which supplies the flow to the sheave of the primary pulley.

It should be appreciated that a relationship exists between the steady-state correction term, or null, and the operating conditions of the engine ratio control valve and CVT. The null portion 104 of FIG. 2 also provides an actual null output, N.

A null may be defined as the value of the duty cycle for the ratio control valve corresponding to those conditions in which the steady-state error is zero. The nominal null signal combined with the output of the integrator combined with the error signal $e_2$ provides the output signal from the system in FIG. 2. Additionally, the output of the integrator may be viewed as that signal which must be added to a nominal null signal to achieve the actual null condition. Accordingly, an actual null signal, N, may be obtained by combining the nominal null input signal with the output of the integrator section 102.

Also, as illustrated in FIG. 2, a logical generation of an engine speed set point may be provided for use in the engine speed control loop 106. A throttle signal on a line 112 determines the operating point as a function of set point schedule 114, which is shown in the preferred embodiment as a four line segment interpretation of throttle illustrated generally in FIG. 7. The output of the set point schedule 114 is provided to a limiter 116 which in conjunction with a signal representative of the vehicle speed, NCO, on a line 118 provides an engine speed set point to a set point filter 120. The limiter 116 limits the set point based on the vehicle speed.

The set point filter 120 slows the rate of change of the set point to improve the drivability or feel of the vehicle. In the absence of a filter, sudden increases in throttle yield sudden increases in the engine speed setpoint, which results in a relatively rapid speed of ratio change which causes the vehicle to experience a "torque-drop" until the actual engine speed increases to the desired set point. This occurs because the total torque (engine and vehicle) accelerates the engine, rather than the vehicle, to a higher speed. This results in a noticeable hesitation of the vehicle when the throttle is suddenly applied, an experience which the driver does not expect.

Alternately, sudden decreases in throttle result in a speed of ratio change which tends to accelerate the vehicle due to a "torque-surge" until the engine speed drops to the desired set point. This again occurs because of the total load torque being used to decelerate the engine, which results in a sudden lurching of the vehicle which is quite noticeable to the driver upon decreasing the throttle. Again, the driver does not expect such response.

The filter parameters may be chosen to empirically improve the drivability of the vehicle. Because the filter slows the rate of change, the particular parameters may be selected to provide the desired rate of change in response to throttle changes.

In a preferred embodiment, the actual engine speed may be utilized as the initial condition for the set point filter 120. The filter is allowed to run as soon as the clutch of the CVT vehicle is locked-up. This condition or "mode" is referred to as Drive Mode and is explained in more detail in the co-pending application Ser. No. 25,391 and the issued, U.S. Pat. No. 4,648,496.

Figure 3A:
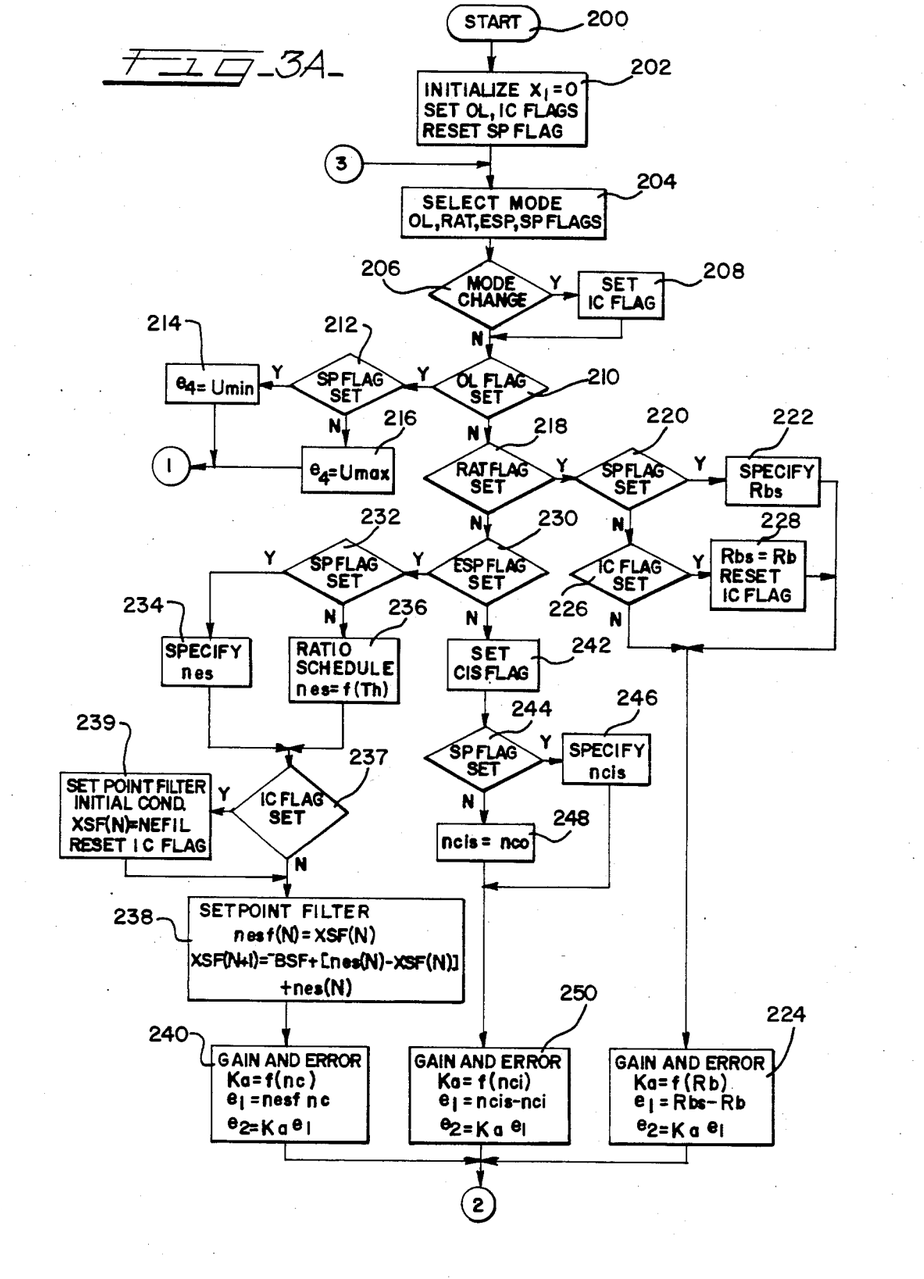
FIG. 3A and FIG. 3B show a diagram flowchart for operation of a ratio control system in accordance with the present invention.
Figure 3B:
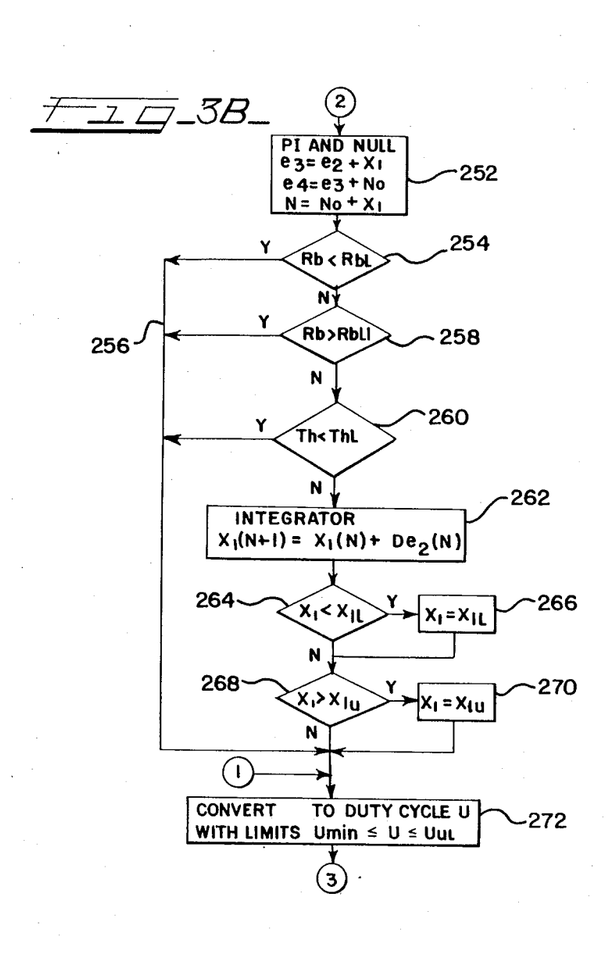

Referring now to FIGS. 3A and 3B, therein is shown a logical flowchart for operation of a CVT ratio control system according to the present invention. As shown, the system begins at a start block 200 and advances to a next block 202 at which initial conditions are set, specifically, the output of the integrator is set to zero, the open loop and initial condition flags are set and the set point flag is reset. The system then advances to a select mode step at a block 204 at which the open loop, ratio, engine speed set point and set point flags are set for the appropriate mode operation set forth above. For example, if the system is to operate in the open loop mode, the open loop (OL) flag is set. The set point (SP) flag is set to correspond to whether the system is to go to and maintain full low or full overdrive ratio as explained more fully below.

At a decision block 206, the system then determines whether a mode change has occurred. If yes, then the initial condition flag is set in block 208. This provides the desired smooth transitions by ensuring that the system will use the appropriate initial conditions, for the setpoints and filter. If no, then the system determines whether the open loop flag is set in block 210. If yes, the system determines whether the set point flag has been set at a block 212. If yes, the controller will place the transmission in full overdrive by setting $e_4$, the output signal, to a minimum at a block 214. The system then branches to convert that signal for the appropriate duty cycle as explained below in conjunction with FIG. 3B. If at the decision block 212, the system determines that the set point flag has not been set, the controller will place the transmission in full low by setting $e_4$ to a maximum at a block 216. The system then branches to convert the $e_4$ output signal to the appropriate duty cycle.

However, if at the decision block 210, the open loop flag is not set, the system determines whether the ratio control flag has been set at a block 218. If yes, the system determines whether the set point flag has been set at a block 220. If yes, then the system specifies the belt ratio set point (Rbs) from an external source at a block 222 and branches to provide the gain and error function as shown by the function block 224.

If the set point flag is not determined to have been set at the decision block 220, then the system determines whether the initial condition flag has been set at a block 226. If yes, then at a block 228 the system sets the belt ratio set point to the actual belt ratio and resets the initial condition flag. The system then advances to provide the gain and error functions shown at the function block 224. If the initial condition flag has not been set as determined at the decision block 226, then the system advances directly to provide the gain and error functions at the block 224 and maintains the current belt ratio.

Returning now to the determinination of whether the ratio control flag has been set at the decision block 218, if no, then the system determines whether the engine speed set point (ESP) flag has been set at a block 230. If yes, then the system determines whether the set point flag has been set at a block 232. If yes, then the engine set point may be specified from an external source as shown at a block 234. If no, then the system looks to the ratio schedule as shown at a block 236 to provide the engine set point. Once either an external engine speed set point or a set point from the ratio schedule has been determined by the block 234 or the block 236, the system advances to block 237 to determine if the IC flag is set. If the IC flag is not set, the system proceeds to the setpoint filter, block 238. If the IC flag is set, the setpoint filter initial condition is set equal to a filtered version of the actual engine speed, NEFIL and resets the IC flag at block 239. The system then branches to the setpoint filter, block 238.

The form of this filter in the frequency domain is:

$$nesf = \frac{1}{s/wsf + 1} nes$$

where wsf is the cutoff frequency of the filter. The discrete form of the filter is:
nesf(N)=XSF(N)
XSF(N+1)=−BSF[nes(N)−XSF(N)]+nes(N)
where:
BSF=exp(−wsf * Tss)
nesf=filtered engine speed setpoint
XSF(N)=filter state variable
nes=engine speed setpoint
Tss=sample rate and initial condition:
XSF(0)=NEFIL (A filtered value of the actual engine speed)

The system then proceeds to block 240 to provide the gain and error functions.

Returning now to the system determination at a decision block 230 of whether the engine set point flag has been set, if no, then the system sets the clutch input speed (CIS) flag at a block 242. The system then determines whether the set point flag has been set at a decision block 244. If yes, then the clutch input speed may be specified at a block 246. If no, then the clutch input speed setpoint is set equal to the clutch output speed at a block 248. Once a clutch input speed set point has been set at either block 246 or block 248, the system advances to the function block 250 to provide the gain and error functions.

At this point, the system advances to the integrator and null functions as shown by the continuation of the logical flow chart to FIG. 3B. The integrator output and null functions are shown generally at a function block 252. The system determines whether the belt ratio is less than some lower limit belt ratio at a decision block 254. If no, the system advances. If yes, then the system skips the integrator function by branching to a line 256 and proceeds to convert the e4 or output signals to the appropriate duty cycle.

If the belt ratio is not less than some lower limit for the belt ratio, the system determines at a decision block 258 whether the belt ratio is greater than the upper limit for the belt ratio. If yes, then some system branches to the line 256 and proceeds to convert the e4 signal for the appropriate duty cycle.

If the belt ratio is less than some upper limit then the system determines at a decision block 260 whether the throttle setting is less than a lower limit throttle setting. If yes, the system branches to the line 256 and skips the integrator functions.

The decision blocks 254, 258 and 260 in conjunction with the line 256 which routes signals past the integrator block 262 corresponds to the logical function of the block 162 of FIG. 2. When the illustrated conditions are met, the system holds the current value at the integrator and advances directly to generation of the appropriate duty cycle signal.

If the throttle is not less than a minimum then the system advances to a block 262 for the integrator functions. Generally, the integrator function will be given by the following formula:

$$X_1(N+1)=X_1(N)+De_2(N)$$

where:
$X_1(N)$=integrator output
$e_2(N)$=integrator input
$D^2$=integrator gain Once the integrator output has been developed, the system determines in a decision block 264 whether the integrator output is less than a lower limit for the integrator. If yes, at a block 266, the system sets the integrator output at the lower limit. If no, the system then advances to a next decision block 268 to determine whether the integrator output is greater than the upper limit for the integrator. If yes, the system sets the integrator output at its upper limit at a block 270 and advances to convert the output signal to a duty cycle with limits between a minimum and a maximum as shown at block 272. The system then branches back to the mode determination block 204 illustrated in FIG. 3A and repeats.

Figure 3C:
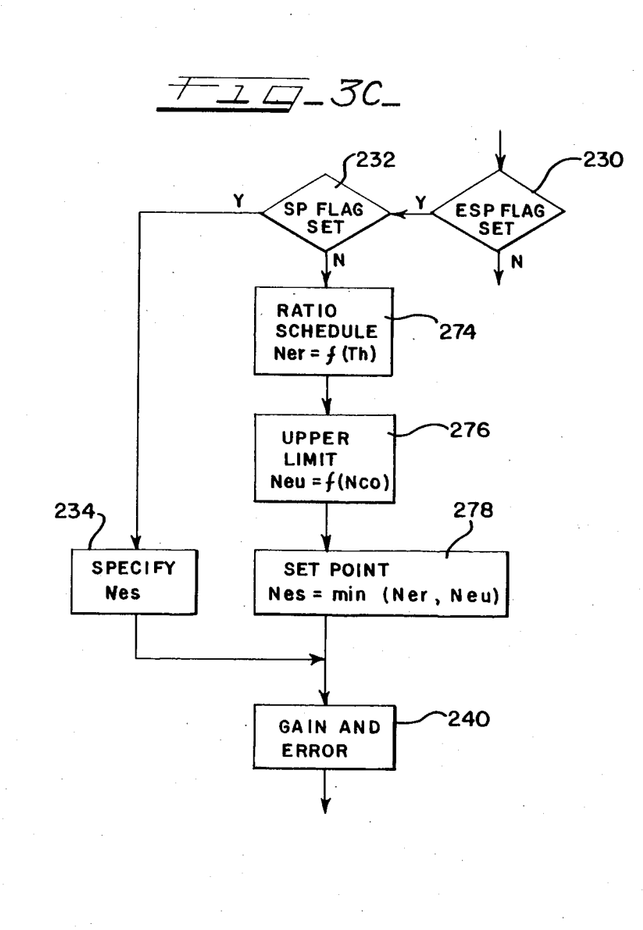
FIG. 3C shows a diagram flow chart for an alternate embodiment for a portion of the system operation shown in FIG. 3A.

Referring now to FIG. 3C there is shown an alternate embodiment for the engine set point control loop. As shown, the decision blocks 230 and 232, and the function blocks 234 and 240 are common to the embodiments of both FIG. 3A and FIG. 3C. However, if at the decision block 232, the system illustrated on FIG. 3C determines that the set point flag has not been set, the system advances to a ratio schedule block 274, similar to the ratio schedule block 236 of FIG. 3A. The system then determines an upper limit on the engine speed setpoint at a block 276 as a function of vehicle speed and advances to a block 278 which determines the engine speed set point as the lesser of the values from the ratio schedule of block 274 and the upper limit of the block 276. The system then advances to the gain and error functional block 240. The embodiment of FIG. 3C is shown in FIG. 2. The function of the block 278 from FIG. 3C is given generally by the function of the limiter block 116 of FIG. 2.

Figure 4:
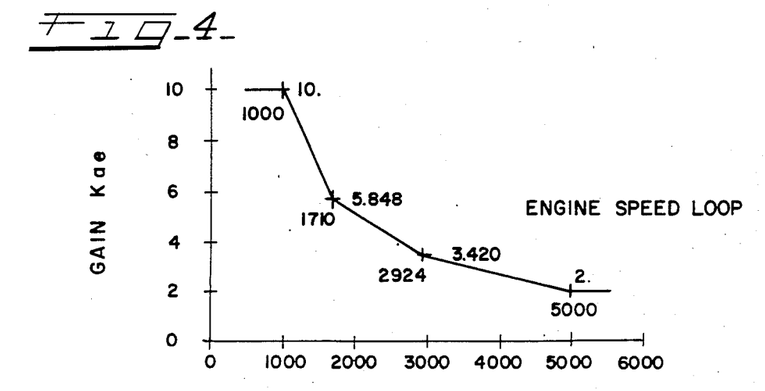
FIG. 4 is an exemplary schedule of engine speed loop gain as a function of engine speed.

Referring now to FIG. 4 therein is shown an exemplary engine speed loop schedule of gain as a function of engine speed. This graph has been analytically determined for exemplary engine performance in a preferred embodiment. It likewise may be determined for particular applications of the present invention in other control systems for continuously variable transmissions depending upon the particular engine being used. It can be seen from the graph of FIG. 4 that a selected gain (Kac) may be determined based on the engine speed (in RPM).

Figure 5:
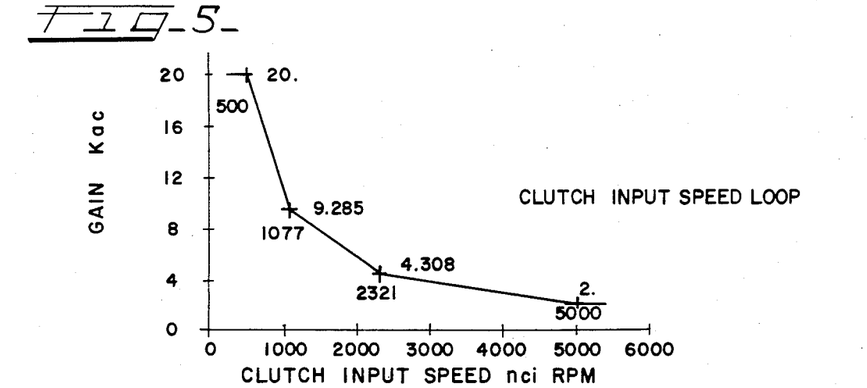
FIG. 5 is an exemplary schedule of clutch input speed loop gain as a function of clutch input speed.

Referring now to FIG. 5, therein is shown an exemplary graph illustrating clutch input speed loop gain as a function of clutch input speed. This graph has been analytically determined from the particular engine utilized in one application of the present invention. Similar gain schedules correspondingly may be generated for particular engines in conjunction with a continuously variable transmission as taught herein. It can be seen that a particular gain (Kac), may be generated or determined as a specific function of clutch input speed based on the graph of FIG. 5.

Figure 6:
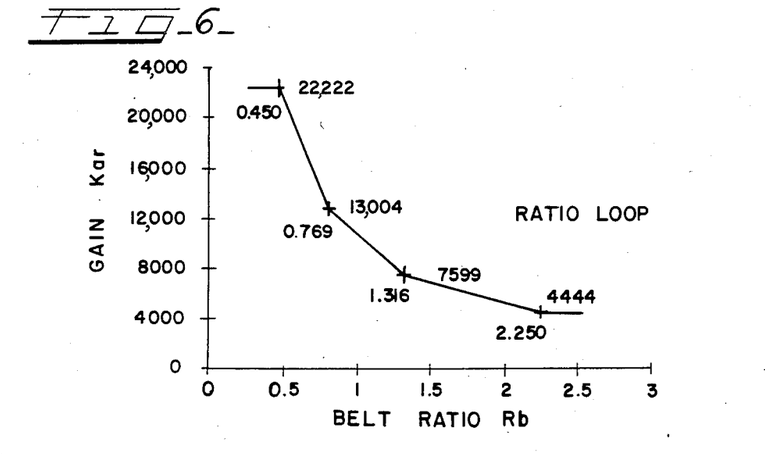
FIG. 6 is an exemplary schedule of ratio loop gain as a function of belt ratio.

Referring now to FIG. 6, therein is shown exemplary ratio loop gain as a function of belt ratio, (Rb). This graph has been determined analytically from a particular engine used in conjunction with a continuously variable transmission, and governed in accordance with the present invention. It can be seen that a particular ratio loop gain, (Kar), may be determined as a function of specific belt ratio (Rb).

Figure 7:
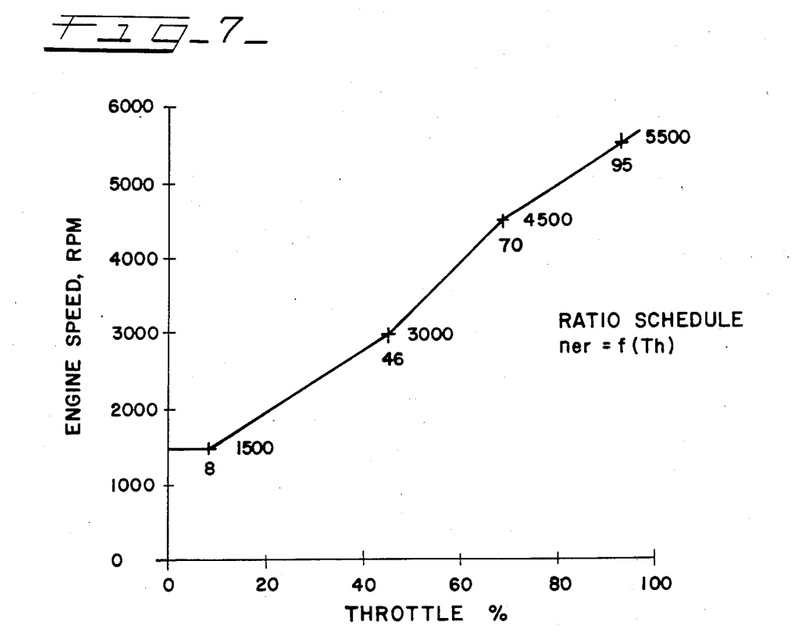
FIG. 7 is an exemplary ratio schedule of engine speed as a function of throttle setting.

Referring now to FIG. 7, therein is shown a ratio schedule of engine speed as a function of throttle. Such a schedule may be embodied in the functional block 114 of FIG. 2. In the graph of FIG. 7, the ratio schedule, of the preferred embodiment, represents a four line, interpolation type graph. An engine speed set point in RPM may be determined from this graph as a function of individual throttle settings. It will be appreciated that the graph of FIG. 7 represents a compilation of data particular to a specific engine and will vary with particular engines and performance criteria chosen for use with continuously variable transmission system of the present invention.

Figure 8:
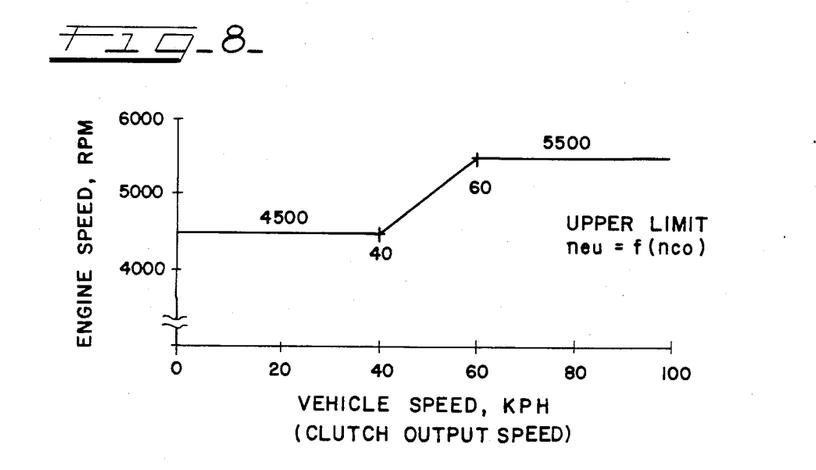
FIG. 8 is an exemplary schedule of upper limit on engine speed as a function of vehicle speed.

Referring now to FIG. 8, therein is shown an upper limit graph of engine speed as a function of vehicle speed. This graph has been generated for specific engine performance in conjunction with a continuously variable transmission in accordance with the present invention. Similar graphs may be compiled for other engines, the details of which would depend upon the particular operating characteristics of the engine in use. This graph provides an upper limit for the engine speed as a function of the vehicle speed and is embodied in the limiter function block 116 illustrated in FIG. 2.

Temperature compensation over the expected range of operating temperatures may be accomplished as taught in a copending application entitled "Temperature Compensation Technique For A Continuously Variable Transmission Control System", Ser. No. 25,392, filed on an even date herewith. Likewise, pulse width modulation for use in the preferred embodiment may be accomplished as taught in a copending application entitled "Pulse Width Modulation Technique," Ser. No. 25,477 filed on an even date herewith.

The present invention has been described above in terms of a number of preferred embodiments and the features thereof. Those features which are deemed to be novel are set forth with particularity in the appended claims. Such modifications and alterations as would be apparent to one of ordinary skill in the art and familiar with the teachings of this application are also deemed to fall within the spirit and scope of the present invention. Interconnections between the system of the present invention for use in a continuously variable transmission and specific program instructions also are deemed to be within the ordinary skill of the art.

What is claimed is:

1. In a continuously variable transmission system having a ratio control valve for controlling the pressure flow to a moveable sheave of at least one pulley for varying the transmission belt ratio, improved means for controlling the operation of the ratio control valve comprising:
   means for providing a desired engine speed set point;
   means for comparing said desired engine speed set point with an actual engine speed measure to provide a first error signal;
   means for providing a desired belt ratio set point;
   means for comparing said desired belt ratio set point with an actual belt ratio measure to provide a second error signal;
   means for providing a desired clutch input speed set point;
   means for comparing said desired clutch input speed set point with an actual clutch input speed measure to provide a third error signal;
   means for selecting one of said first, second and third error signals;
   integrator means responsive to said selected one of said first, second and third error signals to provide a modified error signal; and
   nominal null means responsive to a nominal null signal, said modified error signal and said selected one of said first, second and third error signals to provide an output signal representative of a desired belt ratio to said control valve.

2. The system of claim 1 further including:
   means for limiting said desired engine speed setpoint in response to an actual vehicle speed signal; and
   filter means responsive to the limited engine speed set point to provide a filtered engine speed set point for comparison with an actual engine speed measure.

3. A method for facilitating belt ratio control in a continuously variable transmission system having a ratio control valve for controlling the pressure flow to a movable sheave of at least one pulley for varying the transmission belt ratio including:
   selecting one of a plurality of signal modes for generating an error signal representative of an adjusted difference between a selected set point and a measured parameter, the adjustment value depending at least in part upon the value of the measured parameter;
   modifying said error signal from said selected mode to provide a modified error signal; and
   combining said error signal with a null signal value representative of a desired belt ratio to generate an output signal for controlling said ratio control valve.

4. The method of claim 3 further including:
   sensing when said desired belt ratio corresponds to a full low and a full overdrive condition; and
   switching said output signal to an external source to provide a corresponding full low and full overdrive signal to said ratio control value.

5. A method for belt ratio control in a continuously variable transmission system having a correspondence between a predetermined null signal and a desired belt ratio including:
   selecting one of a plurality of error generation modes;
   establishing a parameter set point for said selected error generation mode;
   comparing said established parameter setpoint with a representative measure of the actual parameter value to provide a first error signal;
   adjusting said first error signal by a proportional gain factor which is varied in response to said parameter value to provide a second error signal; and
   combining said second error signal with said predetermined null signal for controlling said belt ratio at a desired value.

6. The method of claim 5 further including:
   modifying said second error signal to provide a third error signal for combination with said null signal.

7. The method of claim 6 further including:
   monitoring selected system parameter values; and
   inhibiting said modifying when said selected parameters indicate that said system is operating at or about its physical limits.

* * * * *